United States Patent
Lavoie et al.

(10) Patent No.: US 11,167,631 B2
(45) Date of Patent: Nov. 9, 2021

(54) ASSEMBLY OF ELECTRIC ACCUMULATORS

(71) Applicant: HYDRO-QUÉBEC, Quebec (CA)

(72) Inventors: Samuel Lavoie, Quebec (CA); Ghislain Lambert, Quebec (CA); Karim Zaghib, Quebec (CA)

(73) Assignee: HYDRO-QUÉBEC, Quebec (CA)

( * ) Notice: Subject to any disclaimer, the term of this patent is extended or adjusted under 35 U.S.C. 154(b) by 614 days.

(21) Appl. No.: 16/074,179

(22) PCT Filed: Feb. 22, 2017

(86) PCT No.: PCT/CA2017/050218
§ 371 (c)(1),
(2) Date: Jul. 31, 2018

(87) PCT Pub. No.: WO2017/143433
PCT Pub. Date: Aug. 31, 2017

(65) Prior Publication Data
US 2021/0135312 A1    May 6, 2021

(30) Foreign Application Priority Data

Feb. 25, 2016 (CA) .................... CA 2921925

(51) Int. Cl.
*H01M 2/20* (2006.01)
*B60K 1/04* (2019.01)
(Continued)

(52) U.S. Cl.
CPC ........... *B60K 1/04* (2013.01); *B60L 50/64* (2019.02); *H01M 50/213* (2021.01);
(Continued)

(58) Field of Classification Search
CPC ........... H01M 50/204; H01M 50/262; H01M 50/264; H01M 50/213
See application file for complete search history.

(56) References Cited

U.S. PATENT DOCUMENTS

| 4,970,073 A | 11/1990 | Arzur et al. |
| 7,667,432 B2 | 2/2010 | West et al. |

(Continued)

FOREIGN PATENT DOCUMENTS

| CN | 102064303 A | 5/2011 |
| CN | 104981918 A | 10/2015 |

(Continued)

*Primary Examiner* — Amanda C. Walke
(74) *Attorney, Agent, or Firm* — Muirhead and Saturnelli, LLC

(57) ABSTRACT

An assembly module for tubular electric accumulators is disclosed. The assembly module comprises support elements made of insulating material, having arrangements of openings for receiving and holding a group of accumulators in a parallel configuration. Sheets of electrically conductive material extend on surfaces of the support elements. The sheets are welded to the respective terminals of the accumulators and form electrical contact surfaces with the accumulators. Similar assembly modules are arranged in series with complementary arrangements of fastening elements between the adjacent support elements of the modules.

8 Claims, 2 Drawing Sheets

(51) Int. Cl.
*B60L 50/64* (2019.01)
*H01M 50/528* (2021.01)
*H01M 50/264* (2021.01)
*H01M 50/533* (2021.01)
*H01M 50/213* (2021.01)
*H01M 50/588* (2021.01)
*H01M 50/593* (2021.01)
*B60L 50/60* (2019.01)

(52) U.S. Cl.
CPC ....... *H01M 50/264* (2021.01); *H01M 50/528* (2021.01); *H01M 50/533* (2021.01); *H01M 50/588* (2021.01); *H01M 50/593* (2021.01); *B60L 50/66* (2019.02); *H01M 2220/20* (2013.01)

(56) References Cited

U.S. PATENT DOCUMENTS

| | | |
|---|---|---|
| 7,807,290 B2 | 10/2010 | Saiki |
| 7,955,729 B2 | 6/2011 | Onuki et al. |
| 7,968,222 B2 | 6/2011 | Kang et al. |
| 8,426,063 B2 | 4/2013 | Lin |
| 8,492,018 B2 | 7/2013 | Chen et al. |
| 8,603,664 B2 | 12/2013 | Ishizu et al. |
| 8,685,563 B1 | 4/2014 | Lin |
| 8,785,028 B1 | 7/2014 | Saiki |
| 9,083,029 B2 | 7/2015 | Lee et al. |
| 9,136,617 B2 | 9/2015 | Sakae |
| 2010/0231142 A1 | 9/2010 | Yoon |
| 2011/0064993 A1 | 3/2011 | Ochi |
| 2011/0177376 A1 | 7/2011 | Maguire |
| 2011/0217575 A1 | 9/2011 | Hermansson et al. |
| 2011/0236739 A1 | 9/2011 | Watanabe et al. |
| 2013/0196204 A1* | 8/2013 | Song ................. H01M 50/213 429/99 |
| 2013/0202919 A1* | 8/2013 | Hwang ............... H01M 50/502 429/7 |
| 2015/0097425 A1 | 4/2015 | Kimura et al. |
| 2015/0214518 A1 | 7/2015 | Kano |
| 2015/0325824 A1* | 11/2015 | Hasegawa ......... H01M 10/0525 429/53 |
| 2015/0340672 A1 | 11/2015 | Walpurgis |
| 2016/0293910 A1* | 10/2016 | Claudel ................ H01M 50/20 |
| 2017/0187010 A1* | 6/2017 | Hayashi ........... H01M 10/0422 |
| 2017/0346050 A1* | 11/2017 | Morioka ............. H01M 50/502 |
| 2019/0181419 A1* | 6/2019 | Suba ................... H01M 50/20 |
| 2019/0221814 A1* | 7/2019 | Shimizu ............. H01M 50/502 |
| 2020/0203686 A1* | 6/2020 | Park ..................... H01M 50/20 |

FOREIGN PATENT DOCUMENTS

| | | |
|---|---|---|
| DE | 10 2011 119 253 A1 | 5/2013 |
| DE | 10 2011 119253 A1 | 5/2013 |
| EP | 0161450 | 11/1985 |
| EP | 2325926 A1 | 5/2011 |
| JP | 2001155702 A | 6/2001 |
| JP | 2002141114 A | 5/2002 |
| JP | 2011-216366 A | 10/2011 |
| WO | WO2011157954 A1 | 12/2011 |
| WO | WO2013137707 A1 | 9/2013 |
| WO | WO 2014/111233 A1 | 7/2014 |

* cited by examiner

ASSEMBLY OF ELECTRIC ACCUMULATORS

FIELD OF THE INVENTION

The invention generally relates to an assembly of electric accumulators, and more particularly to a module and a process for assembling tubular electric accumulators.

BACKGROUND

Various applications require assembling an important number of electric accumulators arranged in parallel and in series, as in the case of an electric vehicle, for example a bus. It is desirable that the electrical interconnection resistance of the accumulators is minimal. It is also desirable that the assembly of the accumulators may allow to conveniently replace a group of accumulators that could for example exhibit a defect. Other aspects such as thermal expansion of the accumulators, the strength of the contacts in case of vibration and the weight also fall into account.

SUMMARY

An object of the present invention is to provide a module and a process for assembling tubular electric accumulators, for example cylindrical accumulators, minimizing an electrical interconnection resistance of the accumulators and which may advantageously be suitable for applications as in the case of an electric vehicle.

According to an aspect of the invention, there is provided an assembly module for tubular electric accumulators, the assembly module comprising:
  first and second support elements made of insulating material, having respective arrangements of openings for receiving and holding opposite ends of a group of tubular electric accumulators in a parallel configuration, the support elements having respective surfaces in which the ends of the accumulators extend;
  first and second sheets of electrically conductive material, respectively extending against the surfaces of the first and second support elements, the sheets being welded to corresponding ones of the ends of the accumulators and forming electrical contact surfaces with the accumulators; and
  arrangements of fastening elements of the first and second support elements with complementary fastening arrangements of support elements of a similar assembly module for tubular electric accumulators positioned in contact with one of the sheets of the assembly module for tubular electric accumulators.

According to another aspect of the invention, there is provided a process for assembling tubular electric accumulators, the process comprising the steps of:
  mounting the tubular electric accumulators into groups of electric accumulators in parallel in assembly modules coupling in series, the assembly modules each comprising:
    first and second support elements made of insulating material, having respective arrangements of openings for receiving and holding opposite ends of a group of tubular electric accumulators in a parallel configuration, the support elements having respective surfaces in which the ends of the accumulators extend;
    first and second sheets of electrically conductive material, respectively extending against the surfaces of the first and second support elements, the sheets being welded to corresponding ones of the ends of the accumulators and forming electrical contact surfaces with the accumulators; and
    arrangements of fastening elements of the first and second support elements with complementary fastening arrangements of support elements of a similar assembly module for tubular electric accumulators positioned in contact with one of the sheets of the assembly module for tubular electric accumulators,
  positioning the assembly modules in series so that the sheets of electrically conductive material between the assembly modules are in contact with each other; and
  fastening the assembly modules to one another by the arrangements of fastening elements of the assembly modules.

BRIEF DESCRIPTION OF THE DRAWINGS

A detailed description of the preferred embodiments of the invention will be given hereinafter with reference to the following drawings.

DETAILED DESCRIPTION OF THE PREFERRED EMBODIMENTS

Figure 1:
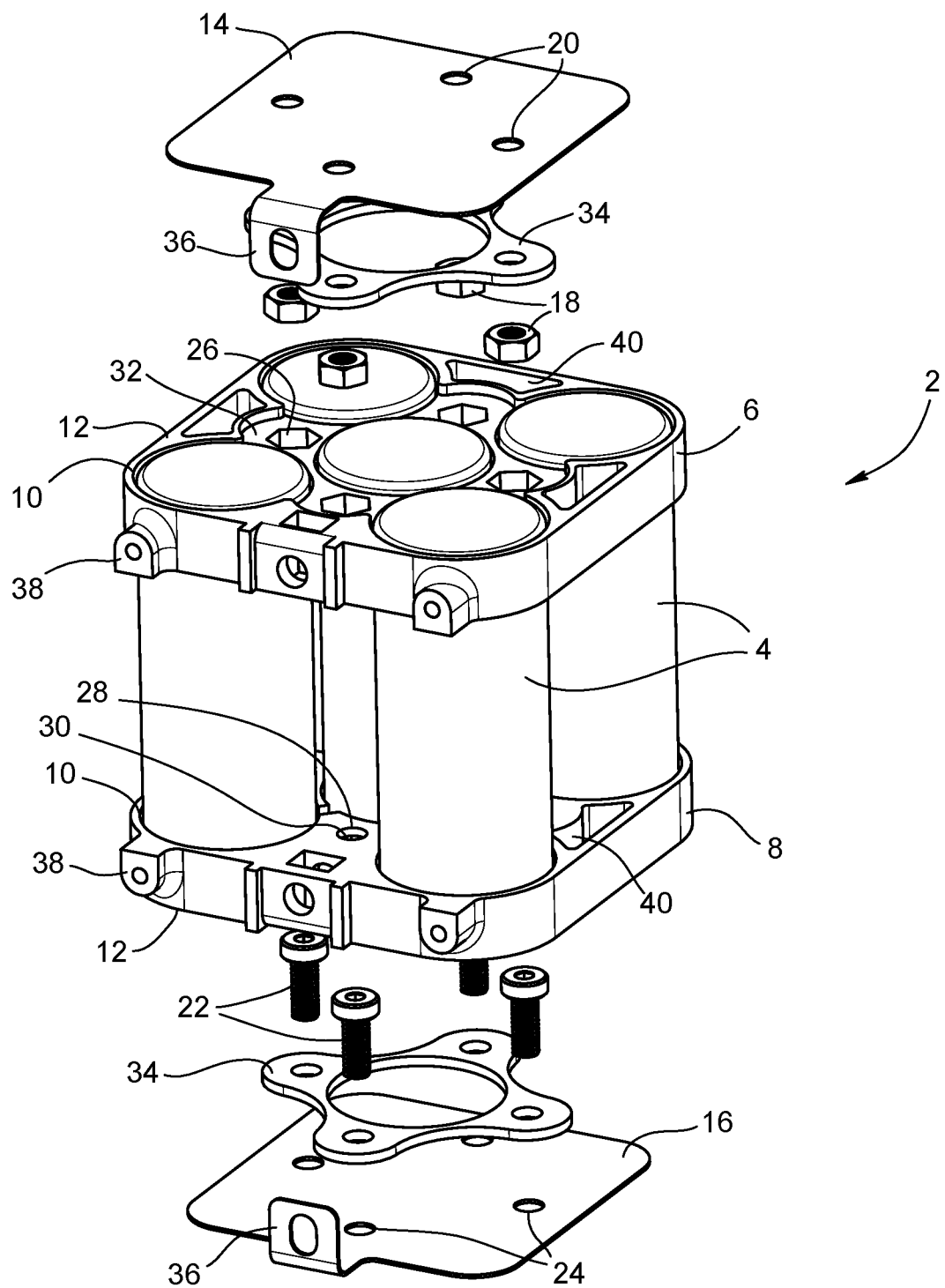
FIG. 1 is an exploded schematic diagram of an assembly module for a group of parallelized electric accumulators according to an embodiment of the invention.
Figure 2:
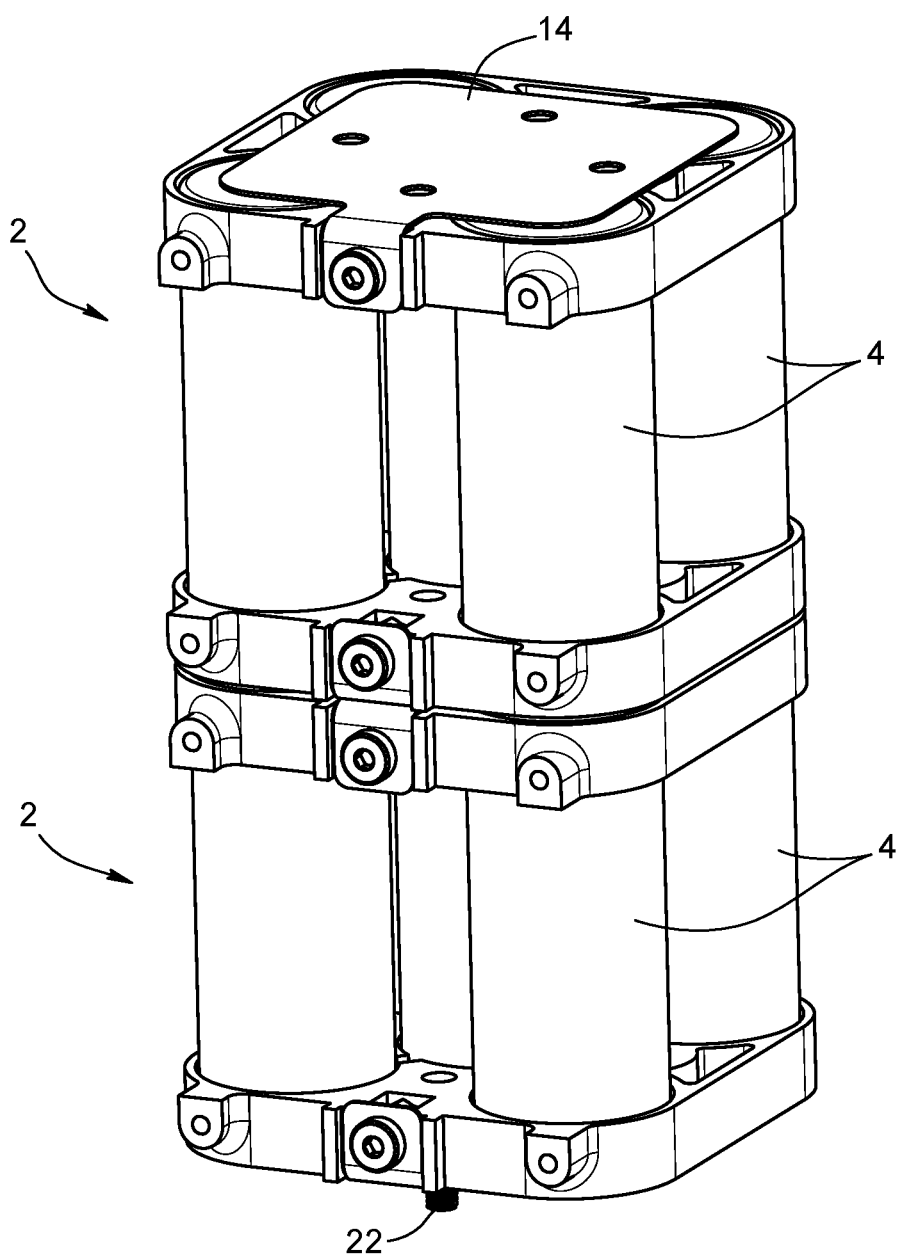
FIG. 2 is a schematic diagram illustrating two assembly modules for groups of parallelized electric accumulators, assembled in serialization position according to an embodiment of the invention.

Referring to FIG. 1, an assembly module 2 for a group of parallelized electric accumulators 4 according to an embodiment of the invention is shown. The module 2 comprises first and second support elements 6, 8 made of insulating material, having respective arrangements of openings 10 for receiving and holding opposite ends of the group of electric accumulators 4 in a parallel configuration. In the illustrated embodiment, the electric accumulators 4 are cylindrical and the openings 10 are round, but other tubular shapes are possible. The support elements 6, 8 have respective surfaces 12 in which the ends of the accumulators 4 extend. First and second sheets 14, 16 of electrically conductive material respectively extend against the surfaces 12 of the support elements 6, 8. The sheets 14, 16 are welded to corresponding ones of the ends (terminals) of the accumulators 4, e.g. by melting the materials, and form electrical contact surfaces with the accumulators 4. Arrangements of fastening elements such as sets of nuts 18 and screws 22 adapted to the nuts 18, allow fastening the support elements 6, 8 with complementary fastening arrangements of support elements of a similar assembly module 2 positioned in contact with one of the sheets 14, 16 of the assembly module 2 as illustrated in FIG. 2. The modules 2 are thus fastened together in a serial arrangement. In the illustrated embodiment, the nuts 18 are mounted on the first support element 6 in alignment with holes 20 in the sheet 14, while the screws 22 project through holes 24 in the sheet 16, the sets of nuts 18 and screws 22 cooperating with sets of nuts and screws of similar assembly modules 2 assembled end to end with the assembly module 2.

The surface 10 of the first support element 6 may comprise housings 26 distributed between the ends of the accumulators 4, for receiving and wedging the nuts 18. The housings 26 may have hexagonal shapes in the case where the nuts 18 are hexagonal. The second support element 8 may comprise holes 28 aligned with the screws 22 to allow their screwing in corresponding nuts 18, for example with an appropriate tool (not shown) as a hexagonal key. The holes 28 may have shoulders 30 preventing passage of the screws 22.

The surfaces 12 of the support elements 6, 8 may comprise recesses 32 (only the recess 32 of the support element 6 is visible in the figure) extending between the ends of the accumulators 4, so that plates 34 made of rigid material are inserted into the recesses 32 between the support elements 6, 8 and the corresponding sheets 14, 16. Such plates 34 allow in particular increasing the mechanical rigidity and the surface of contact with the sheets 14, 16, increasing the electrical conductivity at the same time.

The sheets 14, 16 may have tabs 36 projecting on sides of the support elements 6, 8 to provide electrical fastening points for connecting conductors (not shown) used for example to connect a test device (not shown) for the accumulators 4 of the module 2.

The support elements 6, 8 may have generally rectangular shapes, adapted for uniform and symmetrical distribution of the openings 10 in the support elements 6, 8, and the side-by-side arrangement of stacks of modules 2 assembled together if desired. In the illustrated embodiment, the module 2 allows mounting five accumulators 4 in parallel, but the module 2 may easily be made for mounting nine or another number of accumulators 4 in parallel if desired. The support elements 6, 8 may be provided with brackets 38 projecting on one side of the module 2, for example to mount an electronic circuit (not shown) if desired. The support elements 6, 8 may have other recesses 40 to lighten the weight of the module 2.

Referring to FIG. 2, an assembly of two modules 2 in which groups of accumulators 4 are mounted in parallel is shown. The modules 2 are arranged in series so that the sheets 14, 16 (only the sheet 14 is visible in the figure) between the modules 2 are in contact with each other. The modules 2 are fixed to each other by the sets of nuts 18 and screws 22 (as shown in FIG. 1) forming the arrangements of fastening elements of the assembly modules 2. As the electrical interconnection resistance of the accumulators 4 in parallel and of the modules 2 in series is minimized by the configuration of the modules 2, a large number of modules 2 may thus be assembled as it may be required in an electric vehicle such as a bus. The assembly of the modules 2 also allows to conveniently replace a group of accumulators 4 that could for example exhibit a defect. The space between the support elements 6, 8 allows thermal expansion of the accumulators 4. The configuration of the modules 2 described hereinabove also contributes to reducing their weight, which may be advantageous for an electric vehicle While embodiments of the invention have been illustrated in the accompanying drawings and described above, it will be evident to those skilled in the art that modifications may be made therein without departing from the invention.

The invention claimed is:

1. An assembly module for tubular electric accumulators, the assembly module comprising:
   first and second support elements made of insulating material, having respective arrangements of openings for receiving and holding opposite ends of a group of tubular electric accumulators in a parallel configuration, the support elements having respective surfaces in which the ends of the accumulators extend;
   first and second sheets of electrically conductive material, respectively extending against the surfaces of the first and second support elements, the sheets being welded to corresponding ones of the ends of the accumulators and forming electrical contact surfaces with the accumulators; and
   arrangements of fastening elements of the first and second support elements with complementary fastening arrangements of support elements of a similar assembly module for tubular electric accumulators positioned in contact with one of the sheets of the assembly module for tubular electric accumulators,
   wherein one of the fastening arrangements comprises a set of nuts mounted on the first support element in alignment with holes in the sheet of electrically conductive material of the first support element, and another one of the fastening arrangements comprises a set of screws adapted to the nuts and projecting through holes in the sheet of electrically conductive material of the second support element, the sets of nuts and screws cooperating with sets of nuts and screws of similar assembly modules assembled end to end with the assembly module.

2. The assembly module according to claim 1, wherein the surface of the first support element comprises housings distributed between the ends of the accumulators for receiving and wedging the nuts, and the second support element comprises holes aligned with the screws for allowing their screwing in corresponding ones of the nuts.

3. The assembly module according to claim 2, wherein the holes aligned with the screws have shoulders preventing passage of the screws.

4. The assembly module according to claim 1, wherein the surfaces of the support elements comprise recesses extending between the ends of the electric accumulators, the assembly module further comprising plates made of rigid material inserting in the recesses between the support elements and the corresponding sheets of electrically conductive material.

5. The assembly module according to claim 1, wherein the sheets of electrically conductive material have tabs projecting on sides of the support elements.

6. The assembly module according to claim 1, wherein the electric accumulators are cylindrical and the openings in the support elements are round.

7. The assembly module according to claim 1, wherein the support elements have rectangular shapes, and the openings in the support elements are distributed uniformly and symmetrically.

8. A process for assembling tubular electric accumulators, the process comprising the steps of:
   mounting the tubular electric accumulators into groups of electric accumulators in parallel in assembly modules coupling in series, the assembly modules each comprising:
      first and second support elements made of insulating material, having respective arrangements of openings for receiving and holding opposite ends of a group of tubular electric accumulators in a parallel configuration, the support elements having respective surfaces in which the ends of the accumulators extend;
      first and second sheets of electrically conductive material, respectively extending against the surfaces of the first and second support elements, the sheets being welded to corresponding ones of the ends of the accumulators and forming electrical contact surfaces with the accumulators; and arrangements of fastening elements of the first and second support elements with complementary fastening arrangements of support elements of a similar assembly module for tubular electric accumulators positioned in contact with one of the sheets of the assembly module for tubular electric accumulators, positioning the assembly modules in series so that the sheets of electrically conductive material between the assembly modules are in contact with each other; and fastening the assembly modules to one another by the arrangements of fastening elements of the assembly modules, wherein, for each of one or more of the assembly modules, one of the fastening arrangements comprises a set of nuts mounted on the first support element in alignment with holes in the sheet of electrically conductive material of the first support element, and another one of the fastening arrangements comprises a set of screws adapted to the nuts and projecting through holes in the sheet of electrically conductive material of the second support element, the sets of nuts and screws cooperating with sets of nuts and screws of similar assembly modules of the assembly modules assembled end to end with the assembly module.

* * * * *